(12) United States Patent
Stouffer

(10) Patent No.: US 6,938,835 B1
(45) Date of Patent: Sep. 6, 2005

(54) LIQUID SCANNER NOZZLE AND METHOD

(75) Inventor: Ronald D. Stouffer, Silver Spring, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 167 days.

(21) Appl. No.: 10/021,270

(22) Filed: Dec. 19, 2001

Related U.S. Application Data

(60) Provisional application No. 60/256,471, filed on Dec. 20, 2000.

(51) Int. Cl.$^7$ .............................................. B05B 3/16
(52) U.S. Cl. .................... 239/242; 239/589.1; 137/808
(58) Field of Search ............................. 239/242, 589, 239/589.1; 137/808, 810, 813, 833

(56) References Cited

U.S. PATENT DOCUMENTS

| | | | |
|---|---|---|---|
| 4,151,955 A | * | 5/1979 | Stouffer ........................ 239/11 |
| 4,508,267 A | * | 4/1985 | Stouffer ........................ 239/11 |
| 4,721,251 A | * | 1/1988 | Kondo et al. ................ 239/412 |
| 5,060,867 A | | 10/1991 | Luxton et al. |
| 5,213,269 A | * | 5/1993 | Srinath et al. ............ 239/589.1 |
| 5,213,270 A | * | 5/1993 | Stouffer et al. ........... 239/589.1 |
| 5,769,624 A | * | 6/1998 | Luxton et al. ............... 431/284 |

FOREIGN PATENT DOCUMENTS

WO    WO 99/26021    5/1999

* cited by examiner

Primary Examiner—Dinh Q. Nguyen
(74) Attorney, Agent, or Firm—Jim Zegeer

(57) ABSTRACT

A full coverage area spray device has an oscillation chamber. Chamber end plates have a diameter D and the distance between the inlet and outlet apertures is L and ratio L/D determines the spray pattern and is adapted to support a basic toroidal flow pattern that remains captive within the confines of the oscillation chamber. The toroid spins about its cross-sectional axis and being supplied energy from the jet of liquid issued into the oscillation chamber. The toroidal flow pattern has diametrically opposed cross-sections which alternate in size to cause the jet to move in radial paths and also in tangential direction and thereby choose a different radial path at each sweep, whereby there is a random sweeping of the jet issuing from the outlet aperture over the area.

13 Claims, 2 Drawing Sheets

FIG. 1
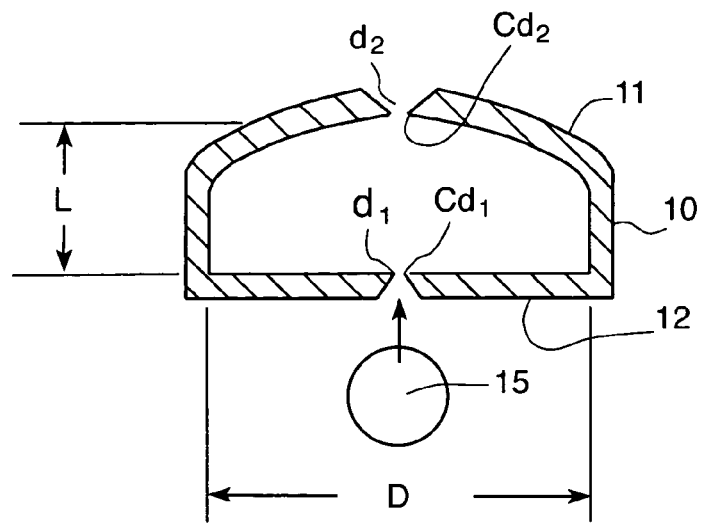
FIG. 2    FIG. 3    FIG. 4
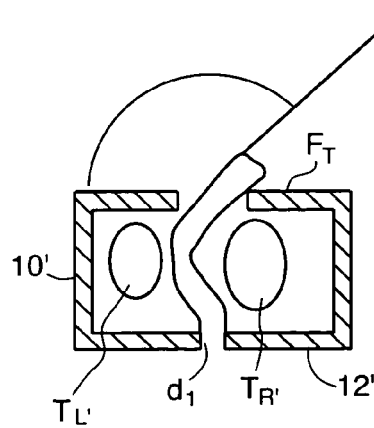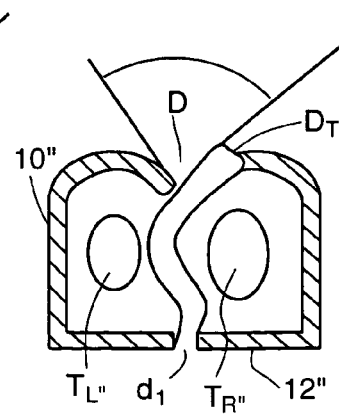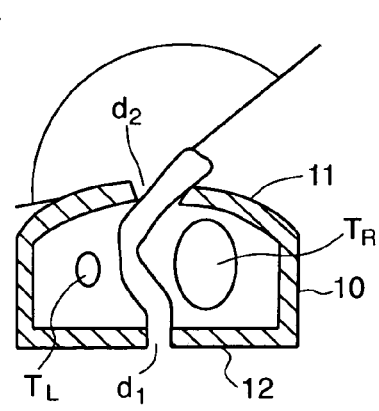

LIQUID SCANNER NOZZLE AND METHOD

REFERENCE TO RELATED APPLICATION

The present application is the subject of provisional application No. 60/256,471 filed Dec. 20, 2000 entitled SCANNER NOZZLE.

BACKGROUND AND BRIEF DESCRIPTION OF THE INVENTION

The present invention relates to a three-dimensional (3-D) scanning nozzle operating in the liquid-to-air mode, and more particularly, to a 3-D scanning nozzle in which a single jet has long wavelengths so that slugs of fluid persist for greater distances from the nozzle thereby providing superior cleaning for hard surfaces by impact and abrasion.

In the past, full coverage sprays have been accomplished by fluidic oscillators that sweep sheets (e.g. see Stouffer U.S. Pat. No. 4,151,955) or by mechanically traversing a sweeping jet over the target surface (as is done in the case of some headlamp washers). Most of the current cleaning jets distribute energy by spreading the jet and rely on wand traversing to providing further distribution. Superior cleaning has been shown by sweeping-jets issued from a fan nozzle of the type shown in Stouffer U.S. Pat. No. 4,508,267 over that of a spread jet, with static (non-sweeping nozzle on headlamp cleaning nozzles.

A single, concentrated jet that is time-shared over an area is superior to a static, multi-jet and should be better than nozzles that sweep just like a fan.

THE PRESENT INVENTION

In order to obtain a full-coverage spray pattern that is also more uniform in both pattern distribution as well as droplet size, the present invention relies on a type of fluidic oscillator that produces a random scan in both radial and tangential directions.

The invention features:

A full coverage area spray nozzle having an oscillation chamber bounded by an upstream end plate and a downstream end plate. An inlet aperture $d_1$ in the upstream end plate is coupled to a source of pressurized liquid to be sprayed on the area and issuing a jet of liquid into the oscillation chamber and an outlet aperture $d_2$ at the downstream end for issuing a jet of the pressurized liquid to ambient. The walls of the oscillation chamber are defined by a line revolved about an axial line passing through the inlet aperture $d_1$ and the outlet aperture $d_2$. The end plates have a diameter D and the distance between the inlet and outlet apertures is L and the ratio L/D determines the spray pattern. The oscillation chamber is adapted to support a basic oscillatory toroidal flow pattern which remains captive within the confines of the oscillation chamber. The toroid spins about its cross-sectional axis and is supplied with energy from the jet of liquid issued into the oscillation chamber. The toroidal flow pattern has diametrically opposed cross-sections which alternate in size to cause the jet to move in radial paths and also in tangential direction and thereby moves in a different radial path at each sweep, whereby there is a random sweeping of the jet issuing from the outlet aperture over the area.

In one preferred embodiment, the downstream end plate is dome shaped.

In another embodiment, the downstream end plate is dimple-shaped.

In another embodiment, the downstream end plate is flat-shaped.

Preferably, the apertures $d_1$ and $d_2$ have sharp edges.

In another embodiment, the distance L between inlet and outlet apertures is adjustable.

The object of the invention is to provide an improved 3-D scanner nozzle which is robust in operation, easy to construct and has wide design flexibility and is capable of adaptation to numerous uses.

DESCRIPTION OF THE DRAWINGS

The above and other objects, advantages and features of the invention will become more apparent when considered with the following specification and accompanying drawings wherein:

FIG. 1 is a schematic illustration of a preferred embodiment of the invention in which the configuration is a figure of revolution, a cylinder with a dome-top or end plate, FIG. 2 is a diagrammatic illustration of a second embodiment of the invention in which the output aperture is in a flat-topped member or end plate, FIG. 3 is a diagrammatic illustration of a third embodiment of the invention in which the outlet aperture is in a dimpled-top member or end plate, FIG. 4 is a diagrammatic illustration of the preferred embodiment of FIG. 1 showing a functional aspect of the invention.

DETAILED DESCRIPTION OF THE INVENTION

Figure 5:
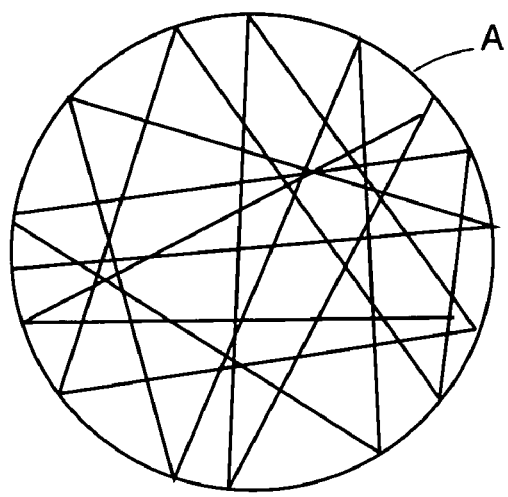
FIG. 5 is a diagrammatic illustration of the random sweeping of jet slugs produced by the invention over an area.

The configuration shown in FIGS. 1 and 4 is a figure of revolution: a cylinder 10 with a domed-top endplate 11. The top end plate 11 and bottom end plate 12 have round orifices or apertures $d_2$ and $d_1$, respectively, which, preferably, are closely sharp edged or chamfered as shown at $Cd_1$ and $Cd_2$. As shown in FIG. 4, the oscillating toroid T is smallest on the left side $T_L$ and largest on the right side $T_R$, but this condition changes or alternates. The toroid flow pattern remains captive within the confines of the oscillation chamber, spinning about its cross-sectional axis and being supplied energy from the liquid jet issuing from orifice $d_1$. The toroidal flow pattern (also shown in FIGS. 2 and 3) has diametrically opposed cross-sections which alternate in size to cause the jet to move in radial paths and also in tangential directions and thereby choose or traverse a different radial path at each sweep. As a result, there is a random sweeping of the jet issuing from the outlet area, as illustrated in FIG. 5.

Use of the domed top 11 has been found to double the output cone angle over that of a flat top. It is believed that the reason for this is that the dome shape gives the most unfavorable angle for recirculation on the weak side. All of the outlets disclosed herein promote recirculation on the side to which the jet is deflected, but the dome shape has the most unfavorable angle to promote recirculation on the opposite side, thereby allowing a larger deflection of the jet.

Referring to FIG. 2, the downstream end plate $F_T$ is flat, and in FIG. 3 the downstream endplate $D_T$ is dimpled with the outlet aperture $d_2''$ in the dimple D. The toroidal flow patterns are essentially the same. In FIGS. 2 and 3, the left toroidal sectional views and right toroidal sectional views are shown as at about the same size.

In FIG. 5, the randomly directed sweeping single jet quickly covers the area A in a substantially uniform distribution and also substantially uniform slugs of liquid. Thus, the scanning jet automatically and continually distributes the jet's effects (cleaning, for example) over an area, even if the wand (not shown) in which the nozzle is mounted were halted.

Various configurations of the scanner nozzle of this invention in the liquid-to-air mode disclose potential advantages beyond the basic one of the 3-D scanning of a single jet with long wavelengths.

Robustness

The nozzle of this invention has liberal tolerances to some large changes to its basic geometry. Almost any inlet nozzle geometry may be used, from a straight tube to a converging nozzle to a sharp edged orifice as shown in FIG. 1. Above a certain absolute value of the chamber dimensions L and D, the performance changes very little. And to defeat the oscillation takes large changes of certain dimensions in specific combinations.

The axisymmetric chamber C works, but it is not necessary to be axisymmetric for oscillation. The shape of the chamber can have asymmetry and still function to support oscillation. For instance, the outlet plane can be askew relative the chamber axis, or the chamber axis can be curved or the chamber cross-section may be asymmetrical.

Ease of Construction

A preferred embodiment is simply a chamber C having an integral floor 12 with a sealed lid 11, wherein the floor has a liquid inlet opening $d_1$ to ingress fluid and the domed-lid or endplate 11 has a hole $d_2$ to egress fluid to ambient. The ingress hole or aperture is connected to a source 15 of liquid under pressure via a valve not shown. The cross-section of the chamber need not be round, but if it is selected, simple, reliable sealing techniques may be practiced.

Figure 6:
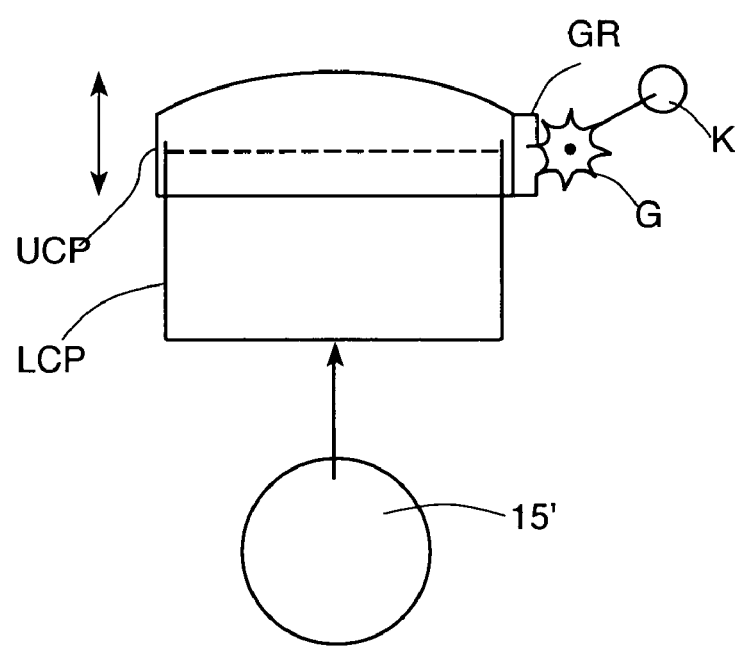
FIG. 6 is a diagrammatic illustration of a length adjustable oscillation chamber.

The chamber length can be varied to change the L/D ratio, as shown in FIG. 6. The upper chamber portion UCF is telescoped over the lower chamber portion LCP. A gear rack GR on upper chamber portion UCP is engaged by gear G, which, upon rotation thereof by knob K adjusts the distance L between the input and output apertures or orifices.

Design Flexibility

Several geometrical parameters appear to be relatively independent and correlate with specific performance. The L/D of the chamber appears to determine whether the spray pattern is planar or full coverage. For L/D>1, a three-dimensional pattern results, whereas a planar spray is produced when L/D is near to 1.

If the design is approached from smaller chamber sizes proceeding to larger chamber sizes with respect to the inlet size, performance changes rapidly until L and D each approach about $10d_1$ beyond which the L and D have little effect on the performance except for the ratio L/D which appears to control the planar vs 3-D mode.

Changing L and D but keeping L/D constant maintains the fan/cone angle constant.

Increase L beyond about $L=10d_1$ with other geometry held constant, does not materially affect performance.

Uses

This configuration with its implied simple construction (can and lid) is geometrically adaptive to many applications. As a spray device it covers an area (circular or a line) by sweeping a single jet. Although the detailed shape of the spray pattern is complex, the effective wavelength is long so that slugs of fluid persist for greater distances from the nozzle exit. This slug-keeping characteristic has been shown to be superior for cleaning of hard surfaces by impactive abrasion.

Some specific uses include (1) changing from planar to full coverage by adjusting the chamber's length (L) and (2) permitting an adjustable spray pattern axis by changing the axis of the output member (lid).

It is believed that a flattened version (elliptical chamber cross-section) will operate to produce fans to various thickness depending on the cross-section's length-to-width ratio.

While the invention has been described in relation to preferred embodiments of the invention, it will be appreciated that other embodiments, adaptations and modifications of the invention will be apparent to those skilled in the art.

What is claimed is:

1. A full coverage area spray nozzle comprising an oscillation chamber having an upstream end plate and a downstream end plate, an inlet aperture $d_1$ in said upstream end plate coupled to a source of pressurized liquid to be sprayed on said area and issuing a jet of liquid into said oscillation chamber, an outlet aperture $d_2$ at said downstream end for issuing a jet of said pressurized liquid to ambient, the walls of said oscillation chamber being defined by a line revolved about an axial line passing through said inlet aperture and said outlet aperture $d_2$, said end plates have a diameter D and the distance between said inlet and outlet apertures is L and ratio L/D determines the spray pattern and is adapted to support a basic toroid flow pattern that remains captive within the confines of said oscillation chamber, said toroid spinning about its cross-sectional axis and being supplied energy from the jet of liquid issued into said oscillation chamber, said toroidal flow pattern having diametrically opposed cross-sections which alternate in size to cause the jet to move in radial paths and also in tangential direction and thereby choose a different radial path at each sweep, whereby there is a random sweeping of the jet issuing from said outlet aperture over said area.

2. The nozzle defined in claim 1 wherein said downstream end plate is dome shaped.

3. The nozzle defined in claim 1 wherein said downstream end plate is dimple shaped.

4. The nozzle defined in claim 1 wherein said downstream end plate is flat shaped.

5. The nozzle defined in claim 1 wherein said apertures $d_1$ and $d_2$ have sharp edges.

6. The nozzle defined in claim 1 wherein the ratio L/D is adjustable.

7. The nozzle defined in claim 1 wherein the distance L between said apertures $d_1$ and $d_2$ is adjustable.

8. A full coverage area spray nozzle comprising an oscillation chamber having an upstream end plate and a downstream end plate, an inlet aperture $d_1$ in said upstream end plate coupled to a source of pressurized liquid to be sprayed on said area and issuing a jet of liquid into said oscillation chamber, an outlet aperture $d_2$ in said downstream end plate for issuing a jet of said pressurized liquid to ambient, the walls of said oscillation chamber being defined by a line revolved about an axial line passing through said inlet aperture and said outlet aperture $d_2$, said end plates having a diameter D and the distance between said inlet and outlet apertures is L and ratio L/D determines the spray pattern, said oscillation chamber causing a basic toroid flow pattern that remains captive within the confines of said oscillation chamber, said toroid spinning about its cross-sectional axis and being supplied energy from said jet of liquid issued into said oscillation chamber, said toroidal flow pattern having diametrically opposed cross-sections which rotate about said axial line and alternate in size to cause said jet to move in a plurality of radial paths and thereby randomly traverse a different radial path at each sweep, whereby there is a random sweeping of the jet issuing from said outlet aperture over said area.

9. The nozzle defined in claim 8 wherein said downstream end plate is dome shaped.

10. The nozzle defined in claim 8 wherein said apertures $d_1$ and $d_2$ have sharp edges.

11. The nozzle defined in claim 8 wherein the ratio L/D is adjustable.

12. The nozzle defined in claim 8 wherein the distance L between said apertures $d_1$ and $d_2$ is adjustable.

13. A full coverage area liquid spray device comprising oscillation chamber, apertured end plates having a diameter D and the distance between the inlet and outlet apertures is L and ratio L/D determines the spray pattern and is adapted to support an oscillatory toroidal flow pattern that remains captive within the confines of said oscillation chamber and spins about its cross-sectional axis and being supplied energy from the jet of liquid issued into the oscillation chamber, said toroidal flow pattern has diametrically opposed cross-sections which alternate in size to cause the jet to sweep in a plurality of different radial paths and also in tangential direction and thereby choose a different radial path at each sweep, whereby there is a random sweeping of the jet issuing from the outlet aperture over the area.

* * * * *